No. 637,042. Patented Nov. 14, 1899.
J. A. STÄCKIG & O. CARLSON.
WEIGHING APPARATUS.
(Application filed May 10, 1898.)
(No Model.)
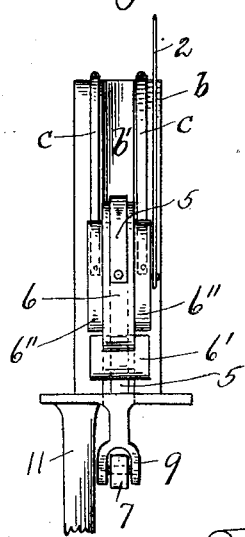
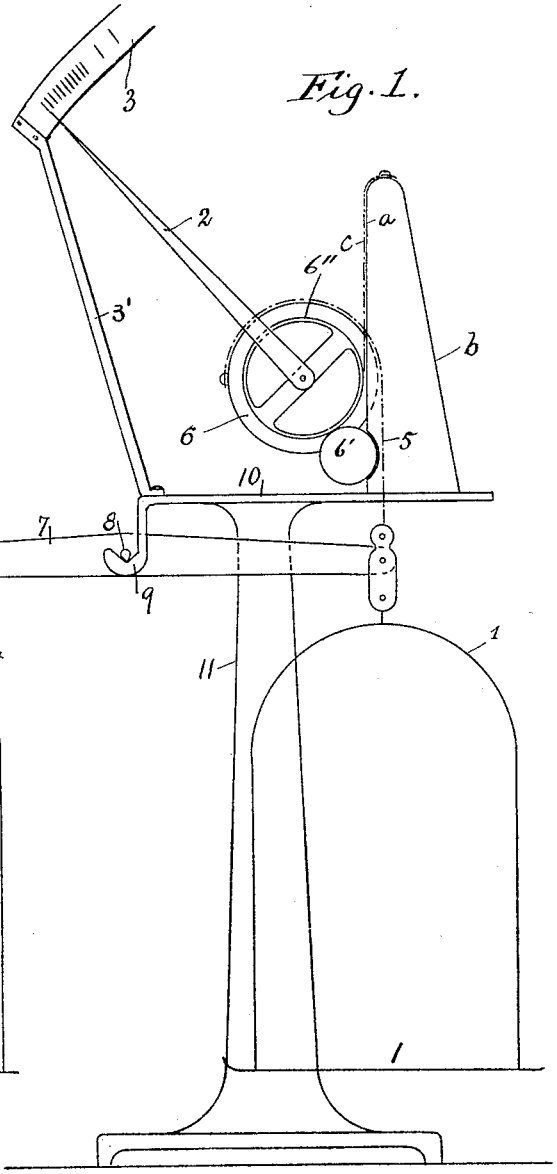

UNITED STATES PATENT OFFICE.

JOHAN AUG. STÄCKIG AND OTTO CARLSON, OF STOCKHOLM, SWEDEN.

WEIGHING APPARATUS.

SPECIFICATION forming part of Letters Patent No. 637,042, dated November 14, 1899.

Application filed May 10, 1898. Serial No. 680,271. (No model.)

*To all whom it may concern:*

Be it known that we, JOHAN AUGUST STÄCKIG, engineer, and OTTO CARLSON, manufacturer, of 42 Luntmakaregatan, Stockholm, in the Kingdom of Sweden, have invented certain new and useful Improvements in Weighing Apparatus, of which the following is a specification.

This invention relates to improvements in weighing apparatus, and has for its object to provide apparatus that can be used with equal facility for weighing heavy and light articles.

In the accompanying drawings, Figure 1 shows a side view of a weighing apparatus made according to the invention. Fig. 2 is a side view of the upper part of Fig. 1 looking toward the right.

As will be seen, the apparatus consists, chiefly, in a combination between an ordinary beam-scale and an automatic weighing apparatus of the kind wherein the weight or load is suspended from a band placed around a wheel or cylinder 6, provided with a counterweight 6', which cylinder when the load is increased rolls upward along the rails or track $a$ on a firm bracket $b$ by means of bands $c$, attached at one end to the said cylinder, preferably by flanges 6'', reversely to band 5, and at the other end to the top of said bracket. As shown, wheel 6 extends into a groove $b'$ in bracket $b$, and the flanges 6'' roll along the straps $c$, which rest on the rails $a$. Said automatic weighing apparatus, *per se*, is not claimed herein, being claimed in our application, Serial No. 680,270, of even date herewith.

The scale-pan 1, adapted to support the article to be weighed, while being attached to the band 5, which is placed around the rolling cylinder 6 in such manner as to turn the cylinder when the band is pulled by a weight on pan 1, is at the same time attached to one end of the beam 7, the other end of which carries a scale-pan 4. The scale-pans 1 and 4 are of the same weight, so that the beam 7 normally stands horizontally. The beam is arranged to move on a pin or pivot 8, provided with a knife-edge and resting against a fork 9, attached to one side of a plate 10, carried by a main standard 11, the other side of said plate serving as a base for the automatic weighing apparatus above mentioned.

When a light article is to be weighed, it is placed on pan 1, while nothing is placed in pan 4. The automatic weighing apparatus will therefore in this instance be brought alone into use, and the weight of the article may be registered or indicated, for example, by means of a pointer 2, rigidly fixed to the cylinder and movable over a graduated scale 3, supported by bracket 3'. If a heavy article is to be weighed, a known weight approximately corresponding thereto, but a little smaller, is first placed in pan 4 of the beam-scale, and the excess weight of the article is then indicated by the automatic weighing apparatus. To obtain the exact weight of the article, it will therefore only be necessary to add the weight in pan 4 and the weight indicated by the pointer of the automatic weighing apparatus.

By our invention we obtain a very sensitive balance the indications of which can be read off with facility.

We claim—

In a weighing apparatus the combination of the standard 11, plate 10, fork 9, a bracket $b$ secured thereto, cylinder 6, oppositely-connected bands $c$ and 5, a pointer 2, graduated scale 3, a scale-beam, a pivot therefor resting in fork 9, a scale-pan 1 connected to band 5 and also to beam 7 at one end, and a scale-pan 4 secured to the opposite end on the beam.

Signed at Stockholm, Sweden, this 26th day of April, 1898.

J. AUG. STÄCKIG.
      OTTO CARLSON.

Witnesses:
 J. NILSSON,
 HUGO PALENQUIST.